US011258686B2

(12) United States Patent
Laxman Karibhimanvar et al.

(10) Patent No.: US 11,258,686 B2
(45) Date of Patent: Feb. 22, 2022

(54) METHODS AND APPARATUS FOR DETERMINING LOW LATENCY NETWORK CONNECTIVITY IN COMPUTING SYSTEMS

(71) Applicant: VMWARE, INC., Palo Alto, CA (US)

(72) Inventors: Siddartha Laxman Karibhimanvar, Bangalore (IN); Karthik Seshadri, Bangalore (IN); Rachil Chandran, Bangalore (IN); Akash Srivastava, Bangalore (IN); Shrisha Chandrashekar, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/799,841

(22) Filed: Feb. 25, 2020

(65) Prior Publication Data
US 2021/0135965 A1 May 6, 2021

(30) Foreign Application Priority Data
Oct. 30, 2019 (IN) .............................. 201941043888

(51) Int. Cl.
*H04L 12/26* (2006.01)
*H04L 43/0811* (2022.01)
*H04L 43/0852* (2022.01)
*H04L 43/0888* (2022.01)

(52) U.S. Cl.
CPC ...... *H04L 43/0811* (2013.01); *H04L 43/0852* (2013.01); *H04L 43/0888* (2013.01)

(58) Field of Classification Search
CPC ............. H04L 43/0811; H04L 43/0852; H04L 43/0888
See application file for complete search history.

(56) References Cited

U.S. PATENT DOCUMENTS

| 7,814,202 | B2* | 10/2010 | Drees ................. G06F 11/3495 |
| | | | 709/224 |
| 10,305,792 | B2* | 5/2019 | Yang ....................... H04L 41/12 |
| 2016/0162369 | A1* | 6/2016 | Ahn .................... G06F 11/1451 |
| | | | 707/654 |

OTHER PUBLICATIONS

VMware (Code)., "VMware API Explorer," can be retrieved from https://code.vmware.com/apis, (18 pages).

* cited by examiner

*Primary Examiner* — Azizul Choudhury
(74) *Attorney, Agent, or Firm* — Hanley, Flight & Zimmerman, LLC

(57) ABSTRACT

An example apparatus comprises a variable determiner to: parse a plurality of network command responses from a first data collector agent and from a second data collector agent; initialize a value for network connectivity parameters corresponding to the network command responses, the value corresponding to the parsed plurality of network command responses; and assign weighted values to the network connectivity parameters; a connectivity analyzer to determine a first network connectivity factor for the first data collector agent and a second network connectivity factor for the second data collector agent; and a recommender system to: determine whether the first network connectivity factor is a smaller value than the second network connectivity factor; and when the first network connectivity factor is the smaller value, initiate the first data collector agent corresponding to the first network connectivity factor to begin collecting data.

21 Claims, 5 Drawing Sheets

METHODS AND APPARATUS FOR DETERMINING LOW LATENCY NETWORK CONNECTIVITY IN COMPUTING SYSTEMS

RELATED APPLICATIONS

Benefit is claimed under 35 U.S.C. 119(a)-(d) to Foreign Application Serial No. 201941043888 filed in India entitled "METHODS AND APPARATUS FOR DETERMINING LOW LATENCY NETWORK CONNECTIVITY IN COMPUTING SYSTEMS", on Oct. 30, 2019, by VMware, Inc., which is herein incorporated in its entirety by reference for all purposes.

FIELD OF THE DISCLOSURE

This disclosure relates generally to computing systems, and, more particularly, to determining low latency network connectivity in computing systems.

BACKGROUND

Virtualizing computer systems provides benefits such as the ability to execute multiple computer systems on a single hardware computer, replicating computer systems, moving computer systems among multiple hardware computers, and so forth. "Infrastructure-as-a-Service" (also commonly referred to as "IaaS") generally describes a suite of technologies provided by a service provider as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a greater scale and at a faster pace than ever before.

Figure 1:
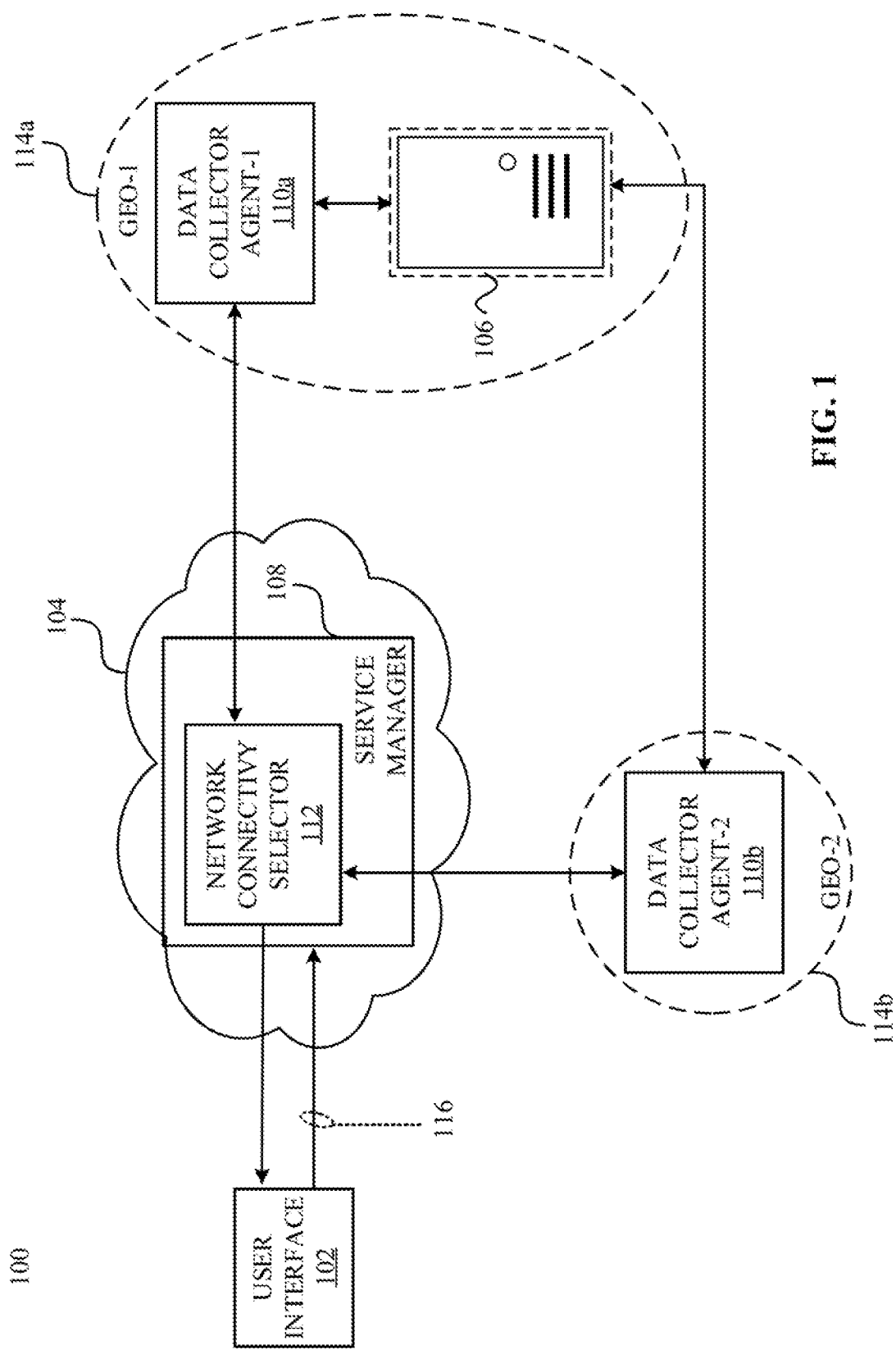
FIG. 1 is a block diagram of an example environment including an example network connectivity selector, an example first data collector agent, an example second data collector agent, and an example managing server.

The figures are not to scale. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

In some cloud computing environments (e.g., cloud computing platforms), there are two primary components: a hypervisor and a managing server.

A hypervisor provides the capability to operate multiple virtual machines (VMs) on hardware resources. In some cloud computing environments, the hypervisor manages an association between VMs and hardware resources because some VMs do not have access to the underlying hardware resources. In some cloud computing environments, a host operating system (OS) with an embedded hypervisor (e.g., a VMWARE® ESXI® hypervisor, etc.) is installed on the server hardware. The hypervisor then deploys the VMs including virtual hardware resources. The hypervisor installs the guest OS in the VM. The hypervisor manages the association between the hardware resources of the server hardware and the virtual resources allocated to the VMs (e.g., associating physical random-access memory (RAM) with virtual RAM, etc.).

A managing server is a single control point for managing a cloud computing platform that includes the above-described hypervisor (e.g., the VMWARE® ESXI® hypervisor), VMs, storage, and networking functionality. For example, the managing server (e.g., a VMWARE® vCENTER SERVER®) may provide capabilities such as logical grouping of infrastructure, clustering, high availability, and fault tolerance to help operationalize and monitor the cloud computing platform in a single pane view.

An example managing server provides application programming interface (API) based access to inventory, statistics, events, properties and logs which facilitate insight into the state of the cloud computing environment (e.g., the hypervisor, VMs, storage, and network functionality). Such data can be used to monitor and troubleshoot problems in the cloud computing environment. For example, problems in a cloud computing environment include resource crunch, memory availability, misconfiguration of resources, etc. These problems of the cloud computing environment can be ascertained from data provided by the managing server.

For example, a cloud computing environment may utilize APIs to collect data, such as inventory, statistics, events, etc., from the managing server to monitor and troubleshoot problems in the cloud computing environment. In such an example, the cloud computing environment may include a data collector agent (e.g., a Remote Data Collector (RDC)) to collect data from the managing server. For example, the data collector agent collects inventory data corresponding to inventory objects, statistics, events, properties, and logs from the managing server. As used herein, "inventory objects," and/or "inventory" are components of the cloud computing environment. Such components include data centers, compute clusters, managing servers, VMs, network objects (e.g., switches and port groups), and storage objects (e.g., logical disks and data stores). In some examples, the data collector agent is packaged for distribution in formats such as Open Virtualization Format (OVF).

The data collector agent can be a specific application of a Software-as-a-Service (SaaS) model. For example, SaaS enables the deployment of software, such as the data collector agent, from a cloud (e.g., a public cloud such as web service such as Amazon Web Services (AWS™), a private cloud such as a cloud hosted by VMware vSphere™ Microsoft Hyper-V™, etc.)) to a user. Thus, software and/or otherwise SaaS, is typically generated and/or deployed to a common infrastructure (e.g., compute infrastructure) accessible by varying tenants of the software. As used herein, a tenant refers to any suitable user (e.g., a personal user, an enterprise system, etc.) accessing and utilizing a SaaS. A SaaS model may be operable on a similar infrastructure as the downloadable licensed software service and/or a shrink-wrapped licensed software applications. In some examples, a provider of SaaS handles installation, deployment, and/or maintenance of the corresponding infrastructure components (e.g., servers, datacenters, hypervisors, and/or other computing devices hosting the SaaS).

In some examples, after the provider installs and deploys SaaS at the tenant accessible infrastructure, the tenant has the ability to deploy multiple data collector agents for different VMs, managed by the managing server, in the cloud computing environment to collect inventory data about the cloud computing environment. When the data collector agent is deployed, specifications and requirements are to be met before the data collection can begin. For example, among other requirements to begin the collection of inventory data between the data collector agent and the managing server, the network connectivity between the data collector agent and the managing server must be functional. The functional network connectivity between the data collector agent and the managing server is a requirement because data collector agents are deployed in a manner such that the compute infrastructure, where the data collector agent operates, is located in a separate network from where the managing server resides. Additionally, the data collector agent can be deployed in the same network in which the managing server resides. If the criterion for network connectivity is satisfied, collection of inventory data by the data collector agent from the managing server can begin.

In some examples, a tenant can deploy multiple data collector agents from multiple geographical locations. For example, an enterprise having multiple office locations located around the world may have a single cloud computing environment in which multiple data collector agents are deployed for collecting inventory data about the cloud computing environment. In such an example, the data collector agents may be deployed in a completely different country than where the managing server of the cloud computing environment is physically located. In some examples, the tenant is required to choose one of many deployed data collector agents when they wish to monitor and/or troubleshoot problems associated with the cloud computing environment. In some examples, the task of choosing a data collector agent is cumbersome because of the number of deployed data collector agents for a single managing server. Additionally, the tenant may be unaware of the potential network connectivity between each data collector agent and the managing server.

Examples disclosed herein provide methods and apparatus to recommend a data collector agent to a tenant. For example, a network connectivity selector is to determine the network connectivity between each available data collector agent and the managing server. The network connectivity selector is further to determine a network connectivity factor for each of the data collector agents. A selection of the data collector agent is based on the network connectivity factor. For example, the network connectivity selector may recommend the data collector agent with the smallest network connectivity factor to be utilized by the tenant to collect data from the managing server because the smallest connectivity factor may be indicative of low latency. In examples disclosed herein, the connectivity factor is a numerical value corresponding to a latency of the network connection or throughput of the network between a data collector agent and the managing server.

As used herein, "latency," "network latency," and "latency network connection" refer to the time taken for a unit of data to transmit from a source (e.g., the managing server) to a destination (e.g., the data collector agent). A low latency network connection is a network connection that experiences short delay times when transmitting a unit of data. A high-latency connection is a network connection that experiences long delay times when transmitting a unit of data. The delay times can be determined "short" or "long" based on the size of the unit of data (e.g., number of bytes), a bit rate, a transmission medium (e.g., fiber optics, twisted-pair copper wire, etc.) and a length of the transmission medium (e.g., the distance that the unit of data is travelling). For example, packet delivery time is equal to transmission time (e.g., packet size divided by bit rate) plus propagation delay (e.g., distance divided by speed of light). A delay time for a first data collector agent can be considered "short" when the distance between the first data collector agent and the managing server is shorter than the distance between a second data collector agent and the managing server. A delay time for the first data collector agent can be considered "long" when the distance between the first data collector agent and the managing server is greater than the distance between the second data collector agent and the managing server.

Additionally, the delay time for the first data collector agent that is sending packets of 1526 bytes can be determined "long" when the bit rate is small (e.g., 100 kilobits per second) compared to the second data collector agent that is also sending packets of 1526 bytes at a higher bit rate (e.g., 100 megabits per second). In such an example, the delay time for the second data collector agent can be determined "short" because the second data collector agent includes a higher bit rate than the first data collector agent. In examples disclosed herein, the network connectivity selector recommends the data collector agent based on the latency network connection (e.g., the lowest latency network connection) as indicated by the network connectivity factor.

As used herein, "throughput," "network throughput," "throughput of the network," etc., refer to the amount of data the network can allow through a given unit of time. For example, network devices communicate by exchanging data packets. Throughput indicates the level of successful data packet delivery from one point on the network to another. Unsuccessful delivery of data packets lowers the throughput and the quality of network connections. For example, unsuccessful deliveries of a data packets equals a decrease in the amount of data the network allowed through, thus resulting in a lower throughput and quality of a network connection. Throughput can be measured in bits per second (bps), megabits per second (Mbps), gigabits per second (Gbps), etc.

In examples disclosed herein, a low latency network connection between the data collector agent and the managing server is important because an increasing number of virtualized workloads in a cloud computing environment generates more events and logs for the data collector agent to collect. For example, the managing server, in combination with other cloud computing features, facilitate the ability for a tenant to increase the number of hypervisors and VMs in the cloud computing environment. In such an example, the inventory data for the cloud computing environment increases in relation to the increasing number of hypervisors and VMs deployed in the cloud computing environment. In some examples, there is an increasing frequency of interaction between the managing server and the data collector agent in relation to the increasing inventory data. Increasing frequency of interaction causes the managing server to generate more events and logs for collection by the data collector agent. In examples where there is a high latency network connection between the managing server and the data collector agent, each interaction between the managing server and the data collector agent will take longer, making a higher frequency of collection of inventory data nearly impossible.

To determine a data collector agent with a low latency network connection, examples disclosed herein automatically analyze the latency characteristics between each available data collector agent and managing server when the tenant requests to receive inventory data. For example, when a tenant requests collection of data from the managing server, methods and apparatus disclosed herein analyze the network connectivity between respective available data collector agents in the cloud computing environment and the managing server. The analysis of the latency characteristics include the example network connectivity selector notifying the data collector agents to send network commands to the managing server and further collecting the network command responses from the managing server. Additionally, the network connectivity selector analyzes the network command responses to determine the network connectivity factors for respective available data collector agents. The analysis performed by network connectivity selector occurs automatically, upon the initialization of data collection, to avoid erroneous selection of a data collector agent with a high latency network connection.

FIG. 1 is a block diagram of an example environment 100 including an example user interface 102, an example cloud network 104, an example managing server 106, an example first data collector agent (DCA-1) 110a, and an example second data collector agent (DCA-2) 110b. The example cloud network 104 includes an example service manager (SaaS) 108.

In FIG. 1, the example user interface 102, the example managing server 106, the example DCA-1 110a, and the example DCA-2 110b are in communication with the example service manager 108. The example user interface 102, the example managing server 106, the example DCA-1 110a, and the example DCA-2 110b may communicate with the example service manager 108 via any wireless communication method and/or device.

In the example of FIG. 1, the example service manager 108 is configured to deploy an example network connectivity selector 112. The example network connectivity selector 112 communicates with the example DCA-1 110a and the example DCA-2 110b. The example managing server 106 and the example DCA-1 110a are located in a first geographical location (geo-1) and the example DCA-2 110b is located in a second geographical location (geo-2).

In the example of FIG. 1, the user interface 102 is operated by a user. For example, the user may utilize a personal computer (PC) to operate the user interface 102. In operation, the user of the user interface 102 transmits an example onboarding request 116 to the cloud network 104. For example, the user of the user interface 102 may transmit the onboarding request 116 via a HyperText Transfer Protocol (HTTP) request, a uniform resource locator (URL), or any suitable means of communication. Such an example HTTP request in the onboarding request 116 may include data indicative of a desired service manager to use.

In the example of FIG. 1, the user interface 102 receives input from the service manager 108. Such input obtained from the service manager 108 may be a link. The link, when selected and/or otherwise clicked on, prompts the user of the user interface 102 to initiate onboarding of a service manager (e.g., select the service manager 108). In examples disclosed herein, onboarding of a service manager (e.g., the service manager 108) may refer to the selection of a specific service manager (e.g., the service manager 108) and/or providing user credentials (e.g., login name, password, etc.) to operate the selected service manager 108. For example, there may be multiple deployed instances of the service manager in the cloud network 104. In some examples, each deployed instance of the service manager may provide different services to the user operating and/or utilizing the managing server 106. Once a user initiates onboarding of a service manager (e.g., the service manager 108), an onboarding reply is sent to the service manager 108. In examples disclosed herein, the onboarding reply includes user-entered information such as service manager credentials and/or a desired service manager to be utilized (e.g., service manager 108). In examples disclosed herein, the user interface 102 may be implemented by a touchscreen, a keyboard, graphical user interface (GUI), etc. However, any other type of user interface device(s) may additionally or alternatively be used. For example, the example user interface 102 may be implemented by an audio microphone, light emitting diodes, a mouse, a button, etc.

In the example of FIG. 1, the cloud network 104 is implemented using a public cloud network. For example, the cloud network 104 may be implemented using a web service such as Amazon Web Services (AWS™). Alternatively, the cloud network 104 may be implemented using any suitable cloud web service such as, for example, a private cloud hosted by VMware vSphere™, Microsoft Hyper-V™, etc., and/or any suitable combination of public and/or cloud web services.

In the example illustrated of FIG. 1, the managing server 106 is a virtual data center management server application. A virtual data center is a pool or collection of cloud infrastructure resources. The basic infrastructure resources are the processor (CPU), memory (RAM), storage (disk space) and networking (bandwidth). The virtual data center is a virtual representation of a physical data center, complete with servers, storage clusters and networking components, all of which reside in virtual space being hosted by one or more actual data centers. In FIG. 1, the example managing server 106 is located in the first geographic location 114a. For example, the managing server 106 is hosted by a data center in the first geographic location 114a.

The example managing server 106 provides a single control point for management and operation, resource provisioning, and performance evaluation of VMs residing on the virtual data center. In some examples, the managing server 106 includes managing server credentials to give authority and/or access of data to a user interface 102. For example, the user interface 102 is provided with managing server credentials in the form of user inputs, in order to provision resources, monitor performance of VMs, collect inventory of the virtual data center, etc. Such managing server credentials include a credential link (e.g., a credential name, IP range, username, etc.), a description of the managing server 106, and/or the IP address or name of the managing server 106. In some examples, after the user interface 102 establishes a connection with the service manager 108 (e.g. the onboarding reply is sent from the user interface 102 to the service manager 108), the user interface 102 can utilize the managing server credentials to access the managing server 106.

The example managing server 106 provides application programming interface (API)-based access to inventory, statistics, events, properties, and logs of a cloud computing environment. An API is an interface or a communication protocol between a client (the service manager 108) and a server (the managing server 106) that allows the client to access features of the server. The managing server APIs facilitate insight into the state of the cloud computing environment. Such insight to the cloud computing environment data can be used to monitor and troubleshoot problems in the cloud computing environment. In some examples, these problems include resource crunch, availability, misconfiguration of resources, etc., of the cloud computing environment. In some examples, insight into the state of the cloud computing environment can be determined by data collector agents (e.g., DCA-1 110a and/or DCA-2 110b) that interact with the managing server APIs.

In the example of FIG. 1, the service manager 108 is deployed in the cloud network 104. In some examples, the service manager 108 operates on a server. For example, the service manager 108 utilizes resources of a server (e.g., CPU, memory (RAM), storage (disk space)) to process data. The example service manager 108 may include a plurality of applications that can be utilized to service virtualized computing components. When a user has onboarded the service manager 108, the service manager 108 provides service options to the user via the user interface 102. For example, the user can request, through the user interface 102, to collect inventory data from the managing server 106. Such a request includes managing server credentials as well as communications for selecting or deploying a data collector agent for the collection of inventory data. The service manager 108 may pass the request (e.g., credentials and other communications) for collecting inventory data to the example network connectivity selector 112. For example, the service manager 108 hosts the example network connectivity selector 112 and the service manager 108 may initiate the network connectivity selector 112 depending on notifications/requests/communications received from the user interface 102. The example network connectivity selector 112 is described in further detail below.

In the example of FIG. 1, the data collector agents DCA-1 110a, DCA-2 110b are remote collector nodes. A collector node gathers multiple input messages (e.g., inventory information messages from the managing server 106). In some examples, when a specific event occurs (e.g., such as a user providing managing server credentials to the service manager 108), the data collector agent propagates the input messages to the service manager 108 for processing, storage, etc. The example data collector agents DCA-1 110a, DCA-2 110b do not store data for a long term, nor do they process data. For example, DCA-1 110a and DCA-2 110b collect data from the managing server 106 via managing server APIs and transfer the data to the service manager 108 to process and report the inventory to the user interface 102.

In some examples, the service manager 108 deploys the data collector agents DCA-1 110a, DCA-2 110b. For example, the user operating the user interface 102 utilizes the service manager 108 to configure and deploy one or more data collector agents (110a, 110b). In some examples, to configure the data collector agents (110a, 110b), the user selects the location in which the data collector agent (110a and/or 110b) is to be deployed. In other examples, the user selects the destination network (e.g., the object in which data is to be collected from) and IP protocol for the data collector agent (110a and/or 110b) and the service manager 108 determines the location (e.g., geographical location of the data center) at which the data collector agent (110a and/or 110b) will operate at. In some examples, the user selects the managing server 106 as the destination network for the data collector agent (110a and/or 110b). In this manner, the data collector agent (110a and/or 110b) is communicatively coupled to the managing server 106 via wireless communications.

In the example of FIG. 1, the first data collector agent DCA-1 110a is deployed in the first geographic location 114a and the second data collector agent DCA-2 110b is deployed in the second geographic location 114b. The DCA-1 110a and DCA-2 110b are both configured to collect inventory data from the example managing server 106. For example, one user deployed DCA-1 110a to collect from the managing server 106 and a different user deployed DCA-2 110b to collect from the managing server 106. In some examples, the first geographic location 114a is a first country (e.g., the United States of America) and the second geographic location 114b is a second country (e.g., the United Kingdom). In FIG. 1, the example managing server 106 is also located in the first geographic location 114a. In examples disclosed herein, the network latency between the DCA-1 110a and the managing server 106 may be smaller than the network latency between the DCA-2 110b and the managing server 106 because the managing server 106 and the DCA-1 110a are located in the same geographic location (e.g., the first geographic location 114a).

The example DCA-1 110a, DCA-2 110b collects inventory data from the managing server 106 in one of two ways: 1) The example DCA-1 110a or the example DCA-2 110b sends requests to the example managing server 106 or 2) The example managing server 106 notifies the example DCA-1 110a or the example DCA-2 110b of data availability. In some examples, data, such as statistics, events and logs, are collected using the second method and inventory and the inventory properties are collected using the first method. In some examples, changes in inventory or attributes of the objects in the inventory are transmitted from the managing server 106 to the DCA-1 110a or the DCA-2 110b. The notifications from the managing server 106 to the DCA-1 110a or the DCA-2 110b are transmitted as a packet that includes at least a header, metadata, and a payload. The header and metadata of the packet are sent to enable the delivery of the payload from destination to source. The payload, in some examples, is indicative of inventory objects in the cloud computing environment. Such inventory objects can include datacenters, compute clusters, host servers, VMs running the host servers, network objects like switches, port groups etc. and storage objects like logical disks and datastores. In other examples, the payload is indicative of events, logs, and other statistics of interest in the cloud computing environment.

In some examples, the payload provided between the managing server 106 and data collector agent is significant in size (e.g., 1600 bytes). For example, the large number of inventory objects in the cloud computing environment results in a bigger payload size relative to a smaller number of inventory objects in the cloud computing environment. Transmitting a payload of increased size can take an unwanted length of time depending on the latency of the network connection between the destination (e.g., DCA-1 110*a* or DCA-2 110*b*) and the source (e.g., managing server 106). For example, a request (e.g., notification, message, etc.) may travel from the data collector agent (110*a* and/or 110*b*) to the managing server 106, then the managing server 106 may provide a high payload response back to the data collector agent (110*a* and/or 110*b*). In such an example, without a low latency network connection, each of the interactions between the data collector agent (110*a* and/or 110*b*) and the managing server 106 takes longer than the data collector agent (110*a* and/or 110*b*) with a low latency network connection, making a higher frequency of collection difficult to manage and/or maintain. Additionally, transmitting a payload of increased size multiple times can take an unwanted length of time depending on the throughput of the network. For example, the network throughput may be indicative of how many statistics can be sent from the managing server 106 to the data collector agent if the statistics are available every 20 seconds. For example, if the data collector agent (110*a* and/or 110*b*) collects data (e.g., statistics) every minute, then the data collector agent (110*a* and/or 110*b*) collects three points of data. If the data collector agent collects data (e.g., statistics) every five minutes, then the data collector agent collects 15 points of data. In this example, the throughput of the network measures how often the data collector agent (110*a* and/or 110*b*) can collect the data (e.g., every one minute or every five minutes).

In some examples, when the latency of the network connection between the data collector agent (110*a* and/or 110*b*) and the managing server 106 is high (e.g., the length of time to send data between DCA-1 110*a* or DCA-2 110*b* and the managing server 106 is long for the amount of data being shared), the CPU processing the data (e.g., the CPU of the server in which the service manager 108 operates on) is occupied (e.g., operating, using computational resources, etc.) until the DCA-1 110*a* and/or the DCA-2 110*b* propagates the last data packet to the service manager 108. In this example, the processing time of the CPU increases in response to the high latency connection, because data is collected at a slow pace by the example DCA with the highest latency connection. The example network connectivity selector 112 determines a network connectivity factor for each data collector agent (e.g., 110*a*, 110*b*) based on network latency or throughput of the network and further selects the data collector agent with the optimal network connectivity factor. In this manner, the network connectivity selector 112 selects the data collector agent (110*a* or 110*b*) based on the network connectivity factor to avoid increasing the load on the CPU of server in which the example service manager 108 is operating.

In the illustrated example of FIG. 1, the example service manager 108 includes the example network connectivity selector 112 to select a data collector agent based on the network connectivity factor (e.g., the network connectivity factor that is indicative of the smallest network latency, highest throughput, etc.). The example network connectivity selector 112 may be implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. In FIG. 1, the example network connectivity selector 112 communicates with the example user interface 102, the example first data collector agent 110*a*, and the example second data collector agent 110*b*. Additionally or alternatively, the network connectivity selector 112 can communicate with a single data collector agent and/or a plurality of data collector agents.

In operation, the example service manager 108 receives a request to deploy a data collector agent for collection of inventory data from the example managing server 106. For example, the user provides an IP address or a domain name system (DNS) name to the service manager 108 via the user interface 102. The IP address or DNS identifies the managing server 106. Upon receiving the IP address or DNS, the service manager 108 notifies the network connectivity selector 112 to analyze network latency between data collector agents (e.g., DCA-1 110*a* and DCA-2 110*b*). The notification includes the IP address or DNS. The IP address or DNS facilitates the example network connectivity selector 112 to trigger a command to each available data collector agent (e.g., DCA-1 110*a*, DCA-2 110*b*) to begin collecting inventory data. In some examples, the network connectivity selector 112 informs the DCA-1 110*a* or the DCA-2 110*b* to start collecting inventory data as soon as the network connectivity selector 112 receives the managing server credentials. However, in an effort to determine the data collector agent (110*a* or 110*b*) based on the network connectivity factor, the example network connectivity selector 112 does not trigger the collection of inventory data. For example, when a connection between a data collector agent (110*a* and/or 110*b*) and the managing server 106 is established, there is no further mandate on geographic location of the data collector agent (110*a* and/or 110*b*) or the network proximity from the data collector agent (110*a* and/or 110*b*) to the managing server 106. Furthermore, there can be no assumptions made about the quality and resiliency of the network between the data collector agent (110*a* and/or 110*b*) and the managing server 106. Examples disclosed herein do not begin data collection until network connectivity is determined between each data collector agent (e.g., DCA-1 110*a*, DCA-2 110*b*) and the managing server 106. The example network connectivity selector 112 is described in further detail below in connection with FIG. 2.

Figure 2:
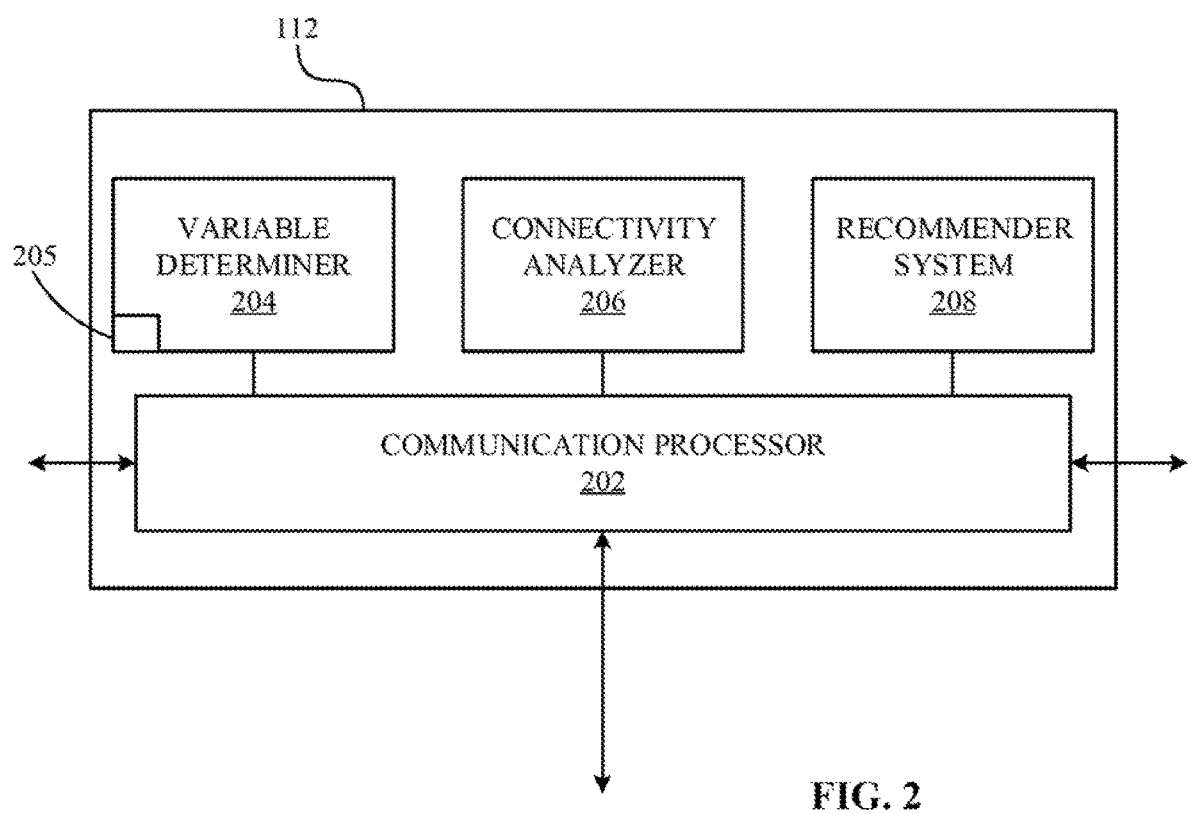
FIG. 2 is a block diagram of an example implementation of the network connectivity selector of FIG. 1, to determine a network connectivity factor for the first data collector agent and the second data collector agent.

FIG. 2 is a block diagram of an example implementation of the network connectivity selector 112 to analyze network connectivity between data collector agents (110*a* and/or 110*b*) and the example managing server 106. The example network connectivity selector 112 includes an example communication processor 202, an example variable determiner 204, an example connectivity analyzer 206, and an example recommender system 208. The example communication processor 202 is coupled to the example variable determiner 204, the example connectivity analyzer 206, and/or the example recommender system 208.

In the illustrated example of FIG. 2, the network connectivity selector 112 includes the communication processor to receive and transmit data between the example user interface 102 (FIG. 2), the example first data collector agent 110a, and/or the example second data collector agent 110b. The example communication processor 202 is coupled to the example variable determiner 204, the example connectivity analyzer 206, and/or the example recommender system 208. The communication processor 202 is hardware which performs actions based on received information. For example, the communication processor 202 provides instructions to at least each of the variable determiner 204, the connectivity analyzer 206, and/or the recommender system 208 based on data received by the example service manager 108 of FIG. 1, and/or the example data collector agents 110a, 110b, such as managing server credentials, data collector agent deployment instructions, network command responses, etc. Such network command responses include network data responses, from the data collector agents 110a, 110b, based on network commands. The communication processor 202 may package information, such as network command instructions, to provide to the data collector agents 110a, 110b or the user interface 102.

In some examples, the communication processor 202 generates network command instructions to trigger the data collector agents 110a, 110b. For example, the communication processor 202 sends a notification/trigger/message to the data collector agents 110a, 110b indicative to send one or more network commands to the managing server 106. A network command is an instruction sent from a destination to a source to request some type of a response from the source. For example, a source (110a, 110b) sends a network command to a destination (106) and the destination (106) sends a response back, via transmission control protocol (TCP), Internet Protocol (IP), HTTP, file transfer protocol (FTP), etc. In some examples, the response includes information about the destination and the network connectivity between the source and destination. Network commands include "traceroute," "ping," "wget," "ipconfig," etc. A "traceroute" determines the hop count between the source and destination by sending Internet Control Message Protocol (ICMP) Echo Request messages to the destination with incrementally increasing Time to Live (TTL) field values. The hop count is the total number of intermediate devices, such as routers, through which a packet of data must pass between the source and destination instead of transmitting directly over a single connection. A "ping" determines the round-trip time for a packet of data to be transmitted from source to destination and back to the source by sending ICMP Echo Request messages. A "wget" command verifies the availability of the managing server 106 to the data collector agent (110a and/or 110b). For example, the data collector agent (110a and/or 110b) may transmit a "wget' command to the managing server 106 and the data collector agent (110a and/or 110b) may receive an index.html file with the title "managing server" which is indicative of connectivity between the data collector agent (110a and/or 110b) and the managing server 106. Alternatively, for example, the data collector agent (110a and/or 110b) may receive an error message after transmitting the "wget" command, indicative that the managing server 106 is not available for the data collector agent (110a and/or 110b). The network command responses are sent from the managing server 106 to the respective data collector agent (110a and/or 110b) and the data collector agent (110a and/or 110b) sends the response to the example communication processor 202. Examples disclosed herein utilize the above-mentioned network commands and corresponding responses to determine the network connectivity factor between each available data collector agent 110a, 110b and the managing server 106.

In the example illustrated in FIG. 2, the network connectivity selector 112 incudes the example variable determiner 204 to identify pertinent information in network command responses and assign the information with a predetermined weight. The predetermined weights are weighted values based off of an importance factor. For example, the importance factor may determine that network latency is more important than network throughput and assign a higher weighted value to the information identified in the network command response corresponding to latency (e.g., packet transmission time) than the information identified in the network command responses corresponding to throughput. In examples disclosed herein, the weights are used to determine the network connectivity factor for each data collector agent 110a, 110b.

In operation, the communication processor 202 accepts network command responses from the data collector agents 110a, 110b and passes the responses to the variable determiner 204. Further, the variable determiner 204 identifies information in the network command responses that correspond to a parameter and/or a variable. The parameters may be network connectivity parameters, network parameters, connectivity parameters, etc. For example, the variable determiner 204 parses the network command responses. In such an example, the variable determiner 204 breaks down the network command responses into a form that allows the variable determiner 204 to identify parameter values (e.g., information). For example, the variable determiner 204 receives the traceroute command response. Further, the variable determiner 204 identifies the total hop count from the traceroute command response and initializes the parameter "H" to equal the total hop count. Additionally, the variable determiner 204 assigns the predetermined weight for parameter "H" to the total hop count. In some examples, the variable determiner 204 may store the information retrieved from the network command responses into a table to organize the information for use by the example connectivity analyzer 206. For example, Table 1 illustrated below displays the information identified from the network command responses for the example first data collector agent 110a and the example second data collector agent 110b.

TABLE 1

| Network Parameter | DCA-1 | DCA-2 |
|---|---|---|
| Packet transmission (P): Average time per packet of 64 bytes | 2.047 ms | 244.342 ms |
| Hop count (H) | 10 | 19 |
| Resource RTT (R) | 0.132 s | 3.516 s |
| Inventory summary time (S) | x | y |
| Inventory summary size (N) | 100 | 100 |

In Table 1, the packet transmission time "P" is the average time taken for a packet of 64 bytes of data to transmit from the managing server 106 to one of the data collector agents 110a, 110b. For example, as illustrated in Table 1, the managing server 106 transmits 64 bytes to the first data collector agent DCA-1 110a in 2.047 milliseconds and the managing server 106 transmits 64 bytes to the second data collector agent DCA-2 110b in 244.342 milliseconds. In some examples, the packet transmission time (P) is determined by the "ping" command. Additionally or alternatively, the example managing server 106 can transmit any size of bytes to determine the "P" parameter.

In Table 1, the hop count "H" is the total number of intermediate devices the network command (e.g., message) passed through when transmitting from the DCA-1 110a to the managing server 106 and from the DCA-2 110b to the managing server. For example, the hop count "H" for DCA-1 110a to the managing server 106 is ten and the hop count "H" for DCA-2 110b to the managing server 106 is 19. In some examples, the hop count "H" is determined by the "traceroute" command.

In Table 1, the resource round trip time (RTT) "R" is the time it takes the network command to go from the DCA-1 110a or DCA-2 110b to the managing server 106 and back to the DCA-1 110a or DCA-2 110b. For example, the round trip time value for the network command from the DCA-1 110a, to the managing server 106, and back to the DCA-1 110a is 0.132 seconds. Further, the round trip time value for the network command from the DCA-2 110b, to the managing server 106, and back to the DCA-2 110b is 3.516 seconds. In some examples, the round trip time can be determined by the "ping" command.

In Table 1, the inventory summary time "S" is the time it takes the managing server API to respond to the inventory request. For example, the communication processor 202 sends a message to the DCA-1 110a and DCA-2 110b to send an HTTP request, IP request, TCP request, etc., to a managing server API to receive only an inventory count. In Table 1, the inventory summary time "S" for the managing server 106 to provide the inventory count to the DCA-1 110a is x seconds and the inventory summary time "S" for the managing server 106 to provide the inventory count to the DCA-2 110b is y seconds. The inventory summary count "S" can be determined based on adding the packet transmission time "P" to the time it takes the managing server API to get a count of inventory data. For example, if the time it takes the managing server API to get a count of the inventory data is 50 milliseconds, then the inventory summary count "S" for the DCA-1 110a is 52.047 milliseconds (e.g., x=2.047 milliseconds+50 milliseconds). Additionally, in this example, the inventory summary count "S" for the DCA-2 110b is 294.342 milliseconds (e.g., y=244.342 milliseconds+50 milliseconds).

In Table 1, the inventory summary size "N" is the number of inventory objects in the cloud computing environment. For example, the N is the total number of VMs plus data centers plus host servers plus statistics plus etc., in which the managing server 106 manages. For example, in Table 1, DCA-1 110a and DCA-2 110b both indicate the inventory summary size "N" is equal to 100 objects. The inventory summary size is the same value across all of the available data collector agents (110a and/or 110b) collecting data from one managing server (managing server 106).

The example Table 1 may be stored in the example memory 205 of the variable determiner 204. Additionally, the example Table 1 may be stored in any memory of the network connectivity selector 112 that is accessible by the communication processor 202 and the connectivity analyzer 206. In some examples, the variable determiner 204 determines a data collector agent identifier to assist in organizing information retrieved from network command responses in the corresponding columns. A data collector agent identifier may be determined by the "wget" command, the IP address, metadata in the network command responses, etc. In some examples, the data collector agent identifier may additionally be utilized for recommending the data collector agent (110a and/or 110b) to the user.

In the example illustrated in FIG. 2, the network connectivity selector 112 includes the connectivity analyzer 206 to determine the network connectivity factor of each data collector agent 110a, 110b based on the information identified in the network command responses. The example connectivity analyzer 206 may retrieve the information identified in the network command responses from the example memory 205 via the communication processor 202. In other examples, the communication processor 202 may provide the information identified in the network command responses to the connectivity analyzer 206 upon receiving a communication signal from the variable determiner 204. For example, the variable determiner 204 may notify the communication processor 202 that the parameter values have been determined for each data collector agent 110a, 110b.

In some examples, the connectivity analyzer 206 utilizes the following equations 1-3 to determine the network connectivity factor for recommending a data collector agent to utilize for inventory data collection. In examples disclosed herein, the recommended data collector agent is the data collector agent that has an optimal network connection with the managing server 106. For example, the recommended data collector agent may be deployed in closer physical proximity to the managing server 106 than the data collector agents not recommended by the recommender system 208.

In some examples, using equation 1, the connectivity analyzer 206 can determine total time to transfer inventory data. The variable "I" refers to the total time, in seconds, to transfer inventory data, the variable "N" refers to the inventory summary size (reported from the network command response), and the variable "P" refers to the packet transmission time (reported from the network command response). The number "64" in the Equation 1 corresponds to the number of bytes per packet of data. The number "1000" is required to convert milliseconds to second because "P" is in milliseconds (e.g., refer to Table 1 for "P" unit).

$$I = \frac{N}{64} \times \frac{P}{1000} \qquad \text{Equation 1}$$

In some examples, using equation 2, the connectivity analyzer 206 determines a weighted sum for the parameter values determined by the variable determiner 204. For example, the weighted sum is a sum of each weighted parameter value (e.g., total time to transfer inventory data (I), inventory summary time (S), round trip time (R), and hop count (H)). As described above, the example variable determiner 204 assigns a predetermined weight for each parameter value. Additionally, the example connectivity analyzer 206 may determine the weights for each parameter upon receipt of the parameter values (e.g., information from the network command responses). For example, the connectivity analyzer 206 may determine the importance factor by analyzing the inventory count "N." The inventory count "N" may be indicative of whether network latency is more important or whether network throughput is more important. In any case, the example connectivity analyzer 206 determines the weighted sum using equation 2 below. The variable "W1" is the weight assigned to the "I" parameter, the variable "W2" is the weight assigned to the "H" parameter, the variable "W3" is the weight assigned to the "S" parameter, and the variable "W4" is the weight assigned to the "R" parameter. The parameters "S," "R," and "H" are all described above in connection with Table 1. The "I" parameter is determined by the connectivity analyzer 206 in equation 1.

$$\text{weighted sum} = (W1 \times 1) + (W2 \times S) + (W3 \times R) + (W4 \times H) \quad \text{Equation 2}$$

The example connectivity analyzer 206 can utilize equation 3 to determine the data collector agent connectivity factor. In equation 3, the variable "CF-n" refers to the connectivity factor of the n data collector agent, wherein n can be indicative of the data collector agent identifier, the data collector agent (110a and/or 110b) that provided the network command responses, etc.

$$CFn = (\text{weighted sum})/100 \quad \text{Equation 3}$$

Equations 1-3 represent one technique the connectivity analyzer 206 can utilize to calculate the connectivity factor for each data collector agent 110a, 110b. However, the connectivity analyzer 206 can utilize any calculations to leverage the network command responses for determining a network connectivity factor of the network connection between each data collector agent 110a, 110b and the managing server 106. The example connectivity analyzer 206 communicates the connectivity factor to the example communication processor 202. The example communication processor 202 packages each factor for the data collector agents 110a, 110b and provides the factors to the example recommender system 208. In some examples, the connectivity analyzer 206 stores the connectivity factors in a memory accessible by the communication processor 202 and the recommender system 208.

In the example illustrated in FIG. 2, the network connectivity selector 112 includes the recommender system 208 to determine the data collector agent for inventory data collection. For example, the recommender system 208 retrieves the minimum value for the group of received connectivity factors. In some examples, the connectivity factor is mapped to a data collector agent identifier. In this manner, the example recommender system 208 can determine the data collector agent for inventory data collection. In some examples, the data collector agent (110a and/or 110b) determined for inventory data collection is the data collector agent (110a and/or 110b) with a smaller network connectivity factor than the other determined network connectivity factors. In such an examples, the recommender system 208 determines whether the network connectivity factor corresponding to DCA-1 110a is a smaller value than the network connectivity factor corresponding to DCA-2 110b.

In some examples, the recommender system 208 retrieves the connectivity factor of the smallest value because, for network latency, the parameters are associated with time and intermediate devices. For example, the less time it takes for a network command (e.g., message) to transmit from the data collector agent (110a and/or 110b) to the managing server 106 and back again, or the less time it takes for the managing server 106 to transmit the packet of data, the better the network latency is. Fast transmitting times results in a smoother collection of data. Referring to Table 1, the example DCA-1 110a may have a smaller connectivity factor than the example DCA-2 110b. For example, the DCA-1 110a has a shorter packet transmission time than the DCA-2 110b, a shorter round trip time than DCA-2 110b, a smaller hop count than DCA-2 110b, etc. Therefore, DCA-1 110a may be determined, by the connectivity analyzer 206, to have a smaller connectivity factor than DCA-2 110b. In such an example, the recommender system 208 may recommend that the user select the DCA-1 110a to collect data from the managing server 106.

In some examples, the recommender system 208 notifies the communication processor 202 of the recommended data collector agent 110a. The example communication processor 202 sends a notification to the example user interface 102 (FIG. 1) responsive to receiving the data collector agent recommendation from the recommender system 208. The notification from the communication processor 202 is indicative of the data collector agent to be utilized for inventory data collection. In some examples, the notification may be sent as a link for the user to click and automatically choose the recommended data collector agent (110a and/or 110b).

In other examples, the example communication processor 202, upon receiving the notification from the recommender system 208, may select the recommended data collector agent. For example, the communication processor 202 may send a network command to the recommended data collector agent to begin collecting inventory, statistics, etc., from the managing server 106. In this manner, the user does not need to select the recommended data collector agent. Instead, the user is informed, by the communication processor 202, of which available data collector agent (110a or 110b) was selected as the data collector agent for inventory data collection.

The data collector agents not chosen as the data collector agent (e.g., DCA-2 110b) to collect inventory data are not to be considered defective. In some examples, the data collector agents not chosen as the data collector agent to collect inventory data may be a more suitable data collector agent for a managing server 106 located in the same geographical location as that data collector agent.

While an example manner of implementing the network connectivity selector 112 of FIG. 1 is illustrated in FIG. 2, one or more of the elements, processes and/or devices illustrated in FIG. 2 may be combined, divided, re-arranged, omitted, eliminated and/or implemented in any other way. Further, the example communication processor 202, the example variable determiner 204, the example connectivity analyzer 206, the example recommender system 208, and/or, more generally, the example network connectivity selector of FIG. 1 may be implemented by hardware, software, firmware and/or any combination of hardware, software and/or firmware. Thus, for example, any of the example communication processor 202, the example variable determiner 204, the example connectivity analyzer 206, the example recommender system 208 and/or, more generally, the example network connectivity selector 112 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example communication processor 202, the example variable determiner 204, the example connectivity analyzer 206, and/or the example recommender system 208 is/are hereby expressly defined to include a non-transitory computer readable storage device or storage disk such as a memory, a digital versatile disk (DVD), a compact disk (CD), a Blu-ray disk, etc. including the software and/or firmware. Further still, the example network connectivity selector 112 of FIG. 1 may include one or more elements, processes and/or devices in addition to, or instead of, those illustrated in FIG. 2, and/or may include more than one of any or all of the illustrated elements, processes and devices.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
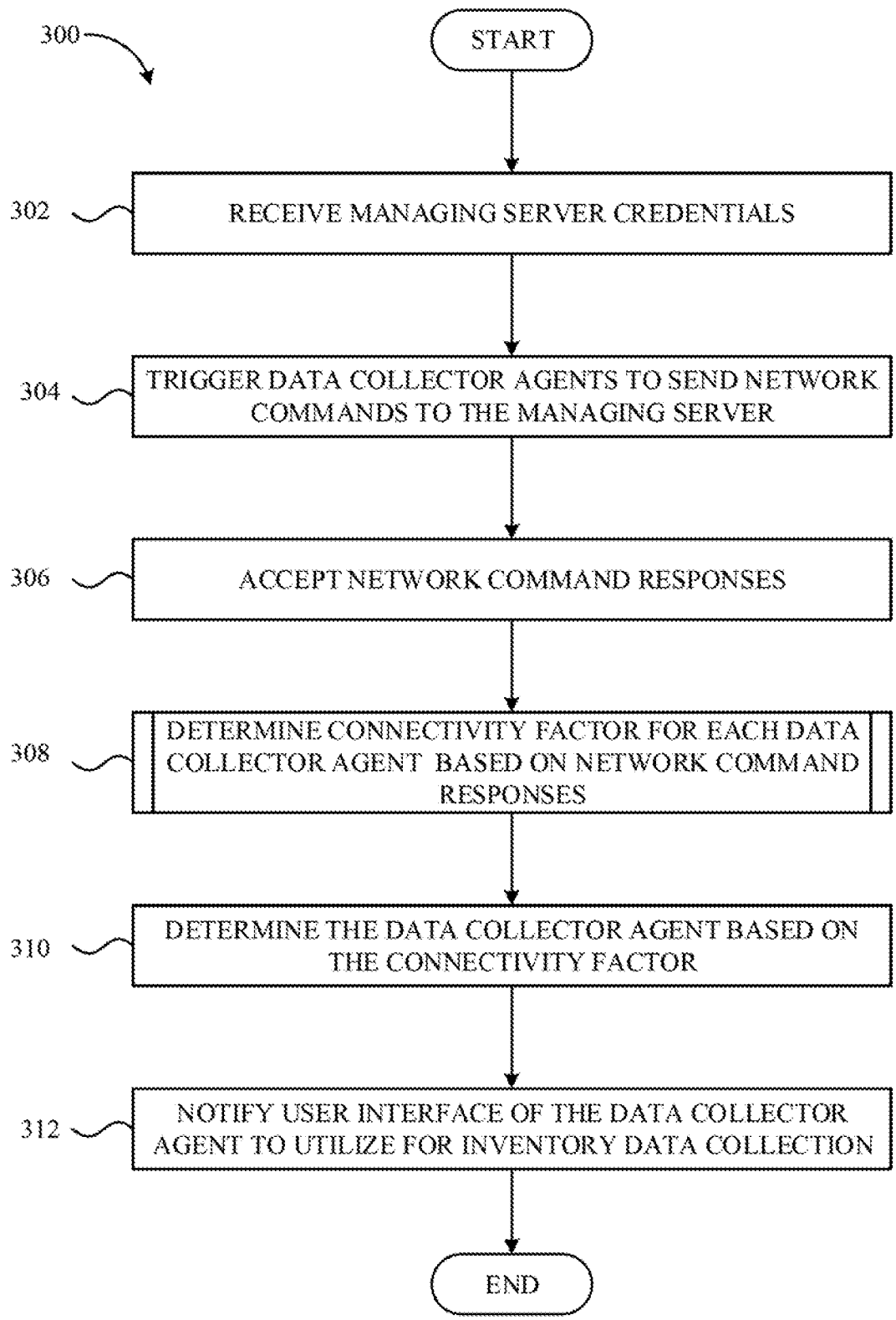
FIG. 3 is a flowchart representative of machine readable instructions which may be executed to implement the network connectivity selector of FIGS. 1 and/or 2 to determine an effective data collector agent to utilize for collecting inventory data.
Figure 4:
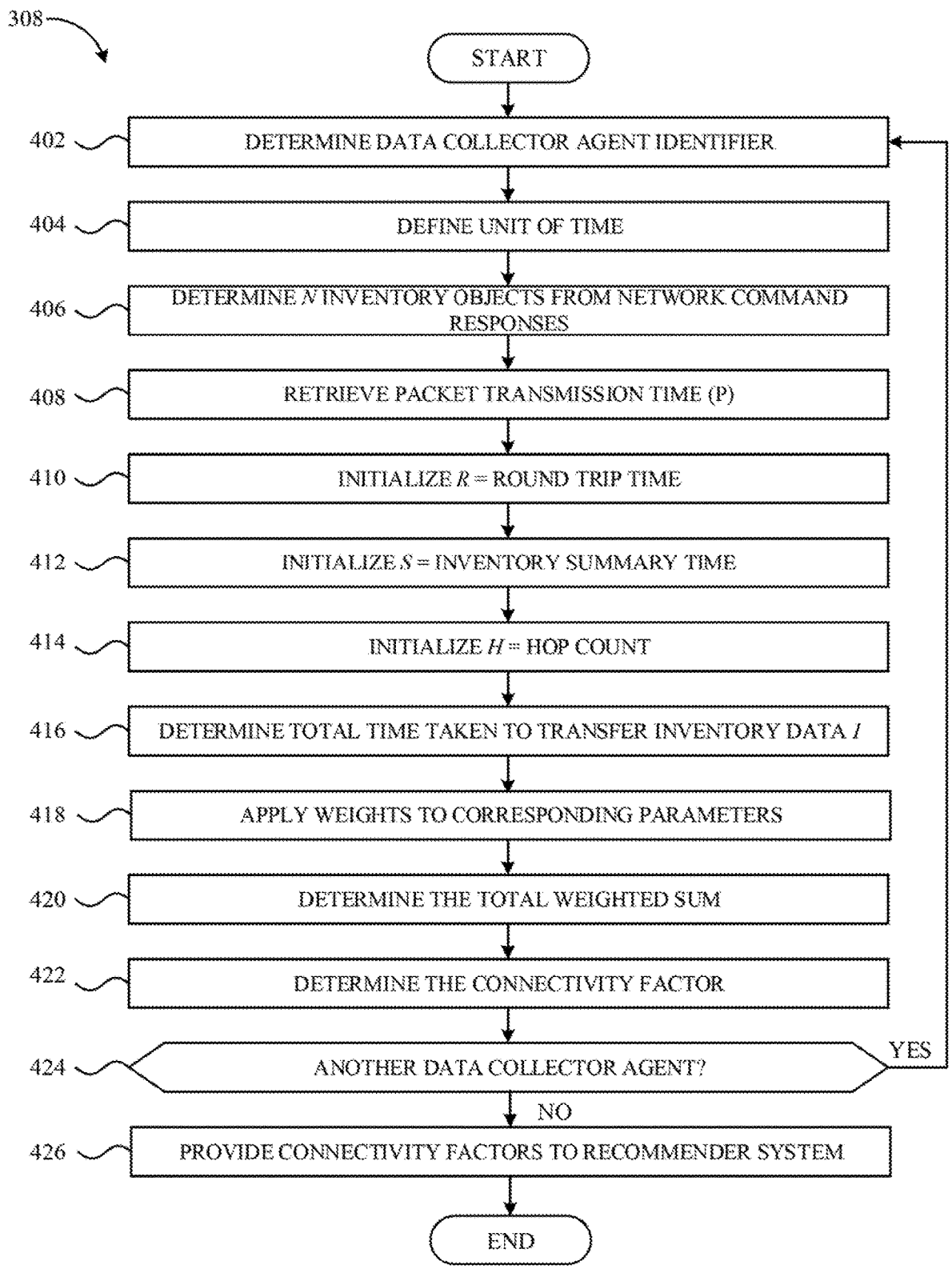
FIG. 4 is a flowchart representative of machine readable instructions which may be executed to implement the example network connectivity selector of FIG. 1 and/or FIG. 2 to determine a network connectivity factor.

A flowchart representative of example hardware logic, machine readable instructions, hardware implemented state machines, and/or any combination thereof for implementing the network connectivity selector 112 of FIGS. 1 and 2 is shown in FIGS. 3-4. The machine readable instructions may be one or more executable programs or portion(s) of an executable program for execution by a computer processor such as the processor 512 shown in the example processor platform 500 discussed below in connection with FIG. 5. The program may be embodied in software stored on a non-transitory computer readable storage medium such as a CD-ROM, a floppy disk, a hard drive, a DVD, a Blu-ray disk, or a memory associated with the processor 512, but the entire program and/or parts thereof could alternatively be executed by a device other than the processor 512 and/or embodied in firmware or dedicated hardware. Further, although the example program is described with reference to the flowchart illustrated in FIGS. 3-4, many other methods of implementing the example network connectivity selector 112 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 3-4 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Example machine readable instructions 300 that may be executed by the network connectivity selector 112 of FIGS. 1 and 2 to determine the data collector agent to be utilized for inventory data collection are illustrated in FIG. 3. With reference to the preceding figures and associated descriptions, the example machine readable instructions 300 of FIG. 3 begin with the example communication processor 202 receiving managing server credentials (Block 302). For example, the user navigating the user interface 102 provides managing server credentials, via the user interface 102, to the service manager 108 to access the managing server. In this example, service manager 108 sends the credentials to the communication processor 202.

The example communication processor 202 triggers the example data collector agents 110a, 110b to send network commands to the example managing server 106 (Block 304). For example, the communication processor 202 informs the data collector agents 110a, 110b of the IP address or DNS name of the target managing server 106 in an effort to trigger network commands. The example data collector agents 110a, 110b send network commands responsive to the trigger. For example, the data collector agents 110a, 110b send "ping" commands, "traceroute" commands, "wget" commands, etc., wherein each command requests the managing server 106 to reply to the command with time, data, etc.

The example communication processor 202 accepts the network command responses (Block 306). For example, the managing server 106 sends network command responses back to the data collector agents 110a, 110b and the data collector agents 110a, 110b forward the network command responses to the communication processor 202. The example communication processor 202 passes the network command responses to the example variable determiner 204.

The example variable determiner 204 and the example connectivity analyzer 206 determine the connectivity factor for each data collector agent 110a, 110b based on the network command responses (Block 308). For example, the variable determiner 204 identifies parameters based on the network command responses and the connectivity analyzer 206 utilizes the parameters to calculate the connectivity factor for each data collector agent 110a, 110b. The operation of block 308 is described in further detail below in connection with FIG. 4.

The example recommender system 208 determines the data collector agent to utilize for data collection based on the connectivity factor (Block 310). For example, the recommender system 208 receives one or more connectivity factors from the connectivity analyzer 206, via the communication processor 202, corresponding to available data collector agents (e.g., DCA-1 110a, DCA-2 110b). Further, the example recommender system 208 retrieves the connectivity factor indicative of a low latency network (e.g., the smallest value network connectivity factor from the determined connectivity factors), a high throughput, etc.

The example communication processor 202 notifies the user interface 102 which data collector agent 110a, 110b is the data collector agent to utilize for inventory data collection (Block 312). For example, the communication processor 202 sends a message, such as a list, a text, etc., to the user interface 102 indicative of which data collector agent the user should select to collect inventory data from the managing server 106. In other examples, the communication processor 202 may select the data collector agent to utilize for inventory data automatically, without waiting for the user's input. In such an example, the communication processor 202 sends a command to the data collector agent to begin collecting inventory, statistics, etc., and may halt communication with the other available data collector agents.

The machine readable instructions 300 may end when the data collector agent has been determined for inventory data collection and the user interface 102 has been notified. In some examples, the machine readable instructions 300 may repeat when the communication processor receives managing server credentials (Block 302).

Example machine readable instructions 308 that may be executed by the variable determiner 204 and the connectivity analyzer 206 of FIG. 2 to determine a connectivity factor for the data collector agents 110a, 110b are illustrated in FIG. 4. With reference to the preceding figures and associated descriptions, the example machine readable instructions 308 of FIG. 4 begin with the example variable determiner 204 determining the data collector agent identifier (Block 402) for which the network command responses were accepted from. For example, the communication processor 202 passes the network command responses to the variable determiner 204 and the variable determiner 204 analyzes metadata of the responses and determines the source of the response (e.g., which data collector agent provided the network command responses).

The example variable determiner 204 may define a unit of time (Block 404) before determining parameter values. For example, the variable determiner 204 may define the standard unit for measuring time (e.g., packet transmission time, round trip time, etc.) to be seconds. In this manner, incoming network command responses corresponding to time may be converted to seconds instead of, for example, minutes, hours, etc.

Further, the example variable determiner 204 determines N inventory objects from the network command responses (Block 406). For example, the "wget" command gets a number of objects in the cloud computing environment that are managed by the managing server 106. In some examples, the variable determiner 204 may begin to generate a table (e.g., Table 1) for storing and mapping the parameters (e.g., I, S, R, H) with corresponding parameter values. Additionally, the example variable determiner 204 retrieves the packet transmission time "P" (Block 408) from the network command responses. For example, the packet transmission time "P" is determined by the "ping" command.

Further the example variable determiner 204 initializes the parameter "R" to equal round trip time (Block 410) based on the network command responses. For example, the total time it takes from the time the trigger is sent to the data collector agent until an acknowledgment of that signal is received is the RTT. The example variable determiner 204 initializes the parameter "S" to equal the inventory summary time (Block 412) based on the network command responses. For example, the inventory summary time "S" is the time it takes for the data collector agent of interest to respond to the trigger sent by the communication processor 202 indicating the inventory size. Lastly, the example variable determiner 204 initializes the parameter "H" to equal the hop count (Block 414). For example, the "traceroute" command determines the hop count.

The variable determiner 204 stores the parameter values in the example memory 205. In some examples, the connectivity analyzer 206 retrieves the stored parameter values. In other examples, the connectivity analyzer 206 receives the stored parameter values from the communication processor 202 after the variable determiner 204 initializes all parameters. The example connectivity analyzer 206 determines the total time taken to transfer inventory data "I" (Block 416). For example, the connectivity analyzer 206 can determine the parameter "I" by utilizing equation 1 as previously described and reprinted below for reference.

$$I = \frac{N}{64} \times \frac{P}{1000} \qquad \text{Equation 1}$$

The example connectivity analyzer 206 applies weights to corresponding parameter values (Block 418). For example, each parameter includes a corresponding weighted factor. In some examples, the weighted factor is a predetermined numerical value which is determined based on an importance factor (e.g., network latency or network throughput). In some examples, the parameter values change when the connectivity analyzer 206 applies the weights to the parameter values at block 418.

Further, the example connectivity analyzer 206 determines the total weighted sum (Block 420) of the weighted parameter values. For example, the connectivity analyzer 206 can determine the total weighted sum by utilizing equation 2 as previously described and reprinted below for reference.

$$\text{weighted sum} = (W1 \times 1) + (W2 \times S) + (W3 \times R) + (W4 \times H) \qquad \text{Equation 2}$$

When the example connectivity analyzer 206 determined the weighted sum of the parameter values (Block 420), the example connectivity analyzer 206 determines the connectivity factor (Block 422) for the data collector agent of interest. For example, the connectivity analyzer 206 can determine the connectivity factor by utilizing equation 3 as previously described and reprinted below for reference.

$$CFn = (\text{weighted sum})/100 \qquad \text{Equation 3}$$

The connectivity analyzer 206 may store the connectivity factor in a memory, such as the local memory 513, the volatile memory 514, and the non-volatile memory 516. The example communication processor 202 may determine if there is another data collector agent to determine a connectivity factor for (Block 424). For example, the communication processor 202 can determine there are additional network command responses that have not been analyzed (Block 424 returns a YES). In this manner, control returns to block 402. In other examples, the communication processor 202 can determine there are not additional command responses to analyze (Block 424 returns a NO) and control turns to block 426, wherein the communication processor 202 provides the calculated connectivity factors to the recommender system 208.

The machine readable instructions 308 end after the communication processor 202 provides connectivity factors to the recommender system 208. In some examples, the machine readable instructions 308 may be repeated when the variable determiner 204 receives network command responses.

Figure 5:
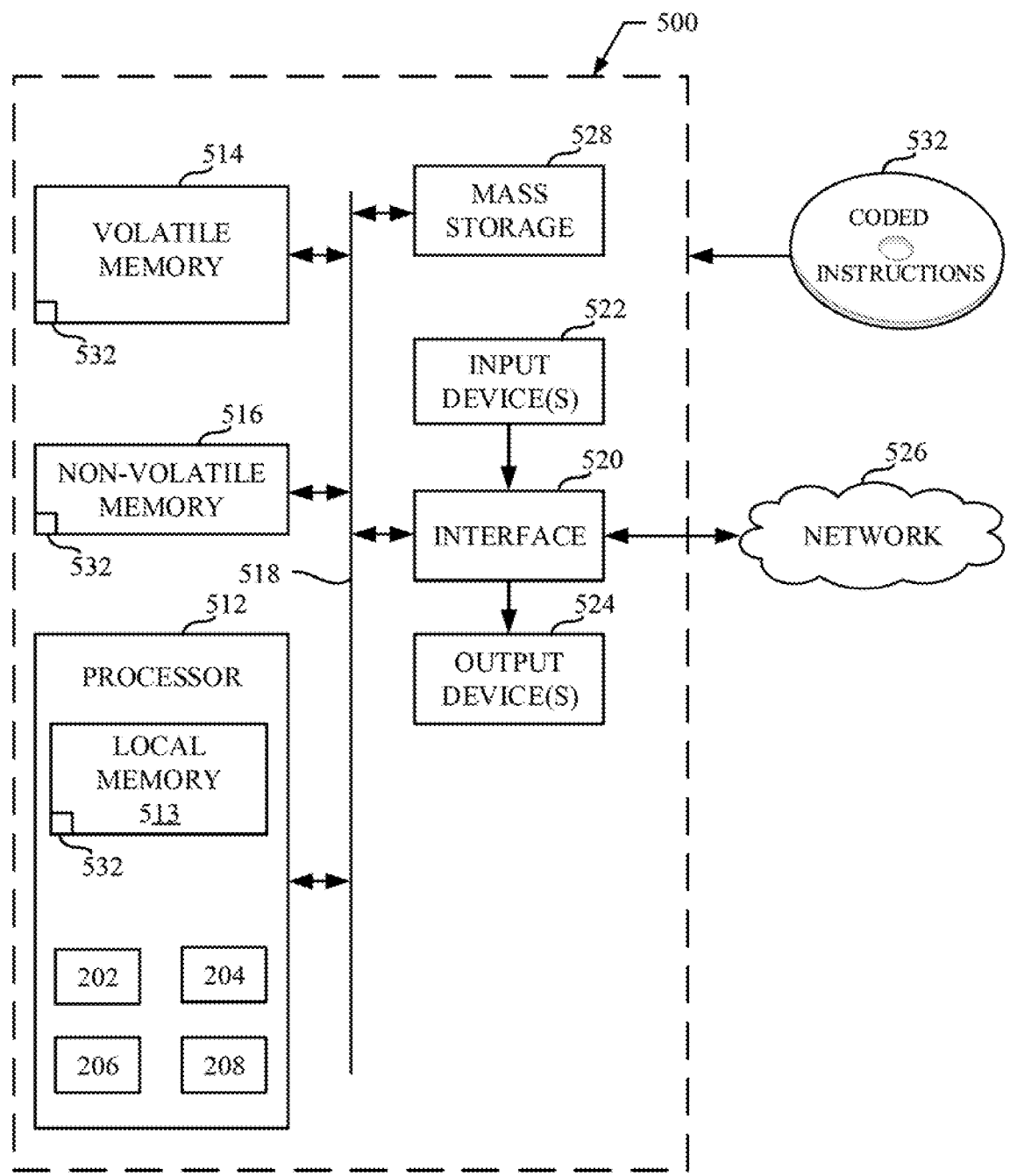
FIG. 5 is a block diagram of an example processing platform structured to execute the instructions of FIGS. 3-4 to implement the example network connectivity selector of FIGS. 1-2.

FIG. 5 is a block diagram of an example processor platform 500 structured to execute the instructions of FIGS. 3-4 to implement the apparatus of FIG. 2. The processor platform 500 can be, for example, a server, a personal computer, a workstation, a self-learning machine (e.g., a neural network), a mobile device (e.g., a cell phone, a smart phone, a tablet such as an iPad™), an Internet appliance, a gaming console, or any other type of computing device.

The processor platform 500 of the illustrated example includes a processor 512. The processor 512 of the illustrated example is hardware. For example, the processor 512 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example communication processor 202, the example variable determiner 204, the example connectivity analyzer 206, and the example recommender system 208.

The processor 512 of the illustrated example includes a local memory 513 (e.g., a cache). The processor 512 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 516 may be implemented by flash memory and/or any other desired type of memory device. Access to the main memory 514, 516 is controlled by a memory controller.

The processor platform 500 of the illustrated example also includes an interface circuit 520. The interface circuit 520 may be implemented by any type of interface standard, such as an Ethernet interface, a universal serial bus (USB), a Bluetooth® interface, a near field communication (NFC) interface, and/or a PCI express interface.

In the illustrated example, one or more input devices 522 are connected to the interface circuit 520. The input device(s) 522 permit(s) a user to enter data and/or commands into the processor 512. The input device(s) can be implemented by, for example, an audio sensor, a microphone, a keyboard, a button, a mouse, a touchscreen, a track-pad, a trackball, isopoint and/or a voice recognition system.

One or more output devices 524 are also connected to the interface circuit 520 of the illustrated example. The output devices 524 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 520 of the illustrated example, thus, typically includes a graphics driver card, a graphics driver chip and/or a graphics driver processor.

The interface circuit 520 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 526. The communication can be via, for example, an Ethernet connection, a digital subscriber line (DSL) connection, a telephone line connection, a coaxial cable system, a satellite system, a line-of-site wireless system, a cellular telephone system, etc.

The processor platform 500 of the illustrated example also includes one or more mass storage devices 528 for storing software and/or data. Examples of such mass storage devices 528 include floppy disk drives, hard drive disks, compact disk drives, Blu-ray disk drives, redundant array of independent disks (RAID) systems, and digital versatile disk (DVD) drives.

The machine executable instructions 532 of FIGS. 3-4 may be stored in the mass storage device 528, in the volatile memory 514, in the non-volatile memory 516, and/or on a removable non-transitory computer readable storage medium such as a CD or DVD.

From the foregoing, it will be appreciated that example methods, apparatus and articles of manufacture have been disclosed that reduce latency for data collection. The disclosed methods, apparatus and articles of manufacture reduce latency for data collection by transmitting and receiving network command responses to determine a network connectivity factor between available data collector agents and a single managing server, and, further, selecting one of the data collector agents, based on the network connectivity factor, to utilize for data collection. The disclosed methods, apparatus and articles of manufacture improve the efficiency of using a computing device by ensuring network connectivity is at a satisfactory level to avoid increasing the load on the CPU of the computing device in which the service manager operates on, wherein the increased load on the CPU can be caused by a data collector agent that includes a high latency network connection with the managing server. The data collector agent that includes a high latency network connection with the managing server takes time to collect data, therefore, the CPU is occupied (e.g., operating, utilizing computing resources, etc.) until the data collector agent propagates the last data packet to the CPU. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   variable determiner circuitry to:
      parse a plurality of network command responses from a first data collector agent and from a second data collector agent;
      initialize a value for network connectivity parameters corresponding to the network command responses, the value corresponding to the parsed plurality of network command responses; and
      assign weighted values to the network connectivity parameters;
   connectivity analyzer circuitry to determine a first network connectivity factor for the first data collector agent and a second network connectivity factor for the second data collector agent; and
   recommender system circuitry to:
      determine whether the first network connectivity factor is a smaller value than the second network connectivity factor; and
      when the first network connectivity factor is the smaller value, initiate the first data collector agent corresponding to the first network connectivity factor to begin collecting data.

2. The apparatus of claim 1, further including a communication processor to accept the plurality of network command responses from the first data collector agent and the second data collector agent.

3. The apparatus of claim 2, wherein the communication processor is to trigger the first data collector agent and the second data collector agent to send a plurality of network commands to a managing server before the first data collector agent or the second data collector agent are initiated to collect data.

4. The apparatus of claim 3, wherein the managing server includes inventory data, statistics, events, and logs of a cloud computing environment for the first data collector agent or the second data collector agent to collect.

5. The apparatus of claim 1, wherein the plurality of network command responses from the first data collector agent are indicative of a first network latency and a first network throughput between the first data collector agent and a managing server and the plurality of network command responses from the second data collector agent are indicative of a second network latency and a second network throughput between the second data collector agent and the managing server.

6. The apparatus of claim 1, wherein the first data collector agent is in a first geographic location and the second data collector agent is in a second geographic location, the first data collector agent in a same geographic location as a managing server.

7. The apparatus of claim 1, wherein the variable determiner circuitry is to determine a hop count value, a round trip time value, a total time to transfer inventory data, and an inventory summary time for the first data collector agent and the second data collector agent based on the plurality of network command responses.

8. The apparatus of claim 1, wherein the connectivity analyzer circuitry is to apply the weighted values to the network connectivity parameters to determine a weighted sum of the network connectivity parameters, wherein the first data collector agent has a first weighted sum and the second data collector agent has a second weighted sum.

9. The apparatus of claim 8, wherein the connectivity analyzer circuitry is to determine the first network connectivity factor based on the first weighted sum and determine the second network connectivity factor based on the second weighted sum.

10. A non-transitory computer readable storage medium comprising computer readable instructions that, when executed, cause at least one processor to at least:
   parse a plurality of network command responses from a first data collector agent and from a second data collector agent;
   initialize a value for network connectivity parameters corresponding to the network command responses, the value corresponding to the parsed plurality of network command responses;
   assign weighted values to the network connectivity parameters;
   determine a first network connectivity factor for the first data collector agent and a second network connectivity factor for the second data collector agent;
   determine whether the first network connectivity factor is a smaller value than the second network connectivity factor; and
   when the first network connectivity factor is the smaller value, initiate the first data collector agent corresponding to the first network connectivity factor to begin collecting data.

11. The non-transitory computer readable storage medium of claim 10, wherein the computer readable instructions, when executed, cause the at least one processor to trigger the first data collector agent and the second data collector agent to send a plurality of network commands to a managing server before the first data collector agent or the second data collector agent are initiated to collect data.

12. The non-transitory computer readable storage medium of claim 11, wherein the computer readable instructions, when executed, cause the at least one processor to collect inventory data, statistics, events, and logs of a cloud computing environment from the managing server.

13. The non-transitory computer readable storage medium of claim 10, wherein the computer readable instructions, when executed, cause the at least one processor to determine a hop count value, a round trip time value, a total time to transfer inventory data, and an inventory summary time for the first data collector agent and the second data collector agent based on the plurality of network command responses.

14. The non-transitory computer readable storage medium of claim 10, wherein the computer readable instructions, when executed, cause the at least one processor to apply the weighted values to the network connectivity parameters to determine a weighted sum of the network connectivity parameters, wherein the first data collector agent has a first weighted sum and the second data collector agent has a second weighted sum.

15. The non-transitory computer readable storage medium of claim 14, wherein the computer readable instructions, when executed, cause the at least one processor to determine the first network connectivity factor based on the first weighted sum and determines the second network connectivity factor based on the second weighted sum.

16. A method comprising:
parsing a plurality of network command responses from a first data collector agent and from a second data collector agent;
initializing a value for network connectivity parameters corresponding to the network command responses, the value corresponding to the parsed plurality of network command responses;
assigning weighted values to the network connectivity parameters;
determining a first network connectivity factor for the first data collector agent and a second network connectivity factor for the second data collector agent;
determining whether the first network connectivity factor is a smaller value than the second network connectivity factor; and
when the first network connectivity factor is the smaller value, initiating the first data collector agent to begin collecting data.

17. The method of claim 16, further including triggering the first data collector agent and the second data collector agent to send a plurality of network commands to a managing server before the first data collector agent or the second data collector agent are initiated to collect data.

18. The method of claim 17, further including collecting inventory data, statistics, events, and logs of a cloud computing environment from the managing server.

19. The method of claim 16, further including determining a hop count value, a round trip time value, a total time to transfer inventory data, and an inventory summary time for the first data collector agent and the second data collector agent based on the plurality of network command responses.

20. The method of claim 16, further including applying the weighted values to the network connectivity parameters to determine a weighted sum of the network connectivity parameters, wherein the first data collector agent has a first weighted sum and the second data collector agent has a second weighted sum.

21. The method of claim 20, further including determining the first network connectivity factor based on the first weighted sum and determines the second network connectivity factor based on the second weighted sum.

* * * * *